United States Patent
Nemoto et al.

(10) Patent No.: US 7,782,321 B2
(45) Date of Patent: Aug. 24, 2010

(54) STATISTICAL VARIABLE DISPLAY APPARATUS AND METHOD, AND STORAGE MEDIUM STORING STATISTICAL VARIABLE DISPLAY PROGRAM

(75) Inventors: Keiichi Nemoto, Kanagawa (JP);
Nobuhiro Yamasaki, Kanagawa (JP);
Takashi Sonoda, Kanagawa (JP);
Masakazu Fujimoto, Kanagawa (JP);
Noriyuki Kurabayashi, Kanagawa (JP);
Masamichi Takahashi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1003 days.

(21) Appl. No.: 11/387,861

(22) Filed: Mar. 24, 2006

(65) Prior Publication Data
US 2006/0213381 A1 Sep. 28, 2006

(30) Foreign Application Priority Data
Mar. 25, 2005 (JP) ............................... 2005-090049

(51) Int. Cl.
*G06T 11/20* (2006.01)
*G09G 5/22* (2006.01)
(52) U.S. Cl. .................................... 345/440; 345/440.2
(58) Field of Classification Search ................. 345/440, 345/440.2
See application file for complete search history.

(56) References Cited

U.S. PATENT DOCUMENTS

| 5,491,779 | A * | 2/1996 | Bezjian ..................... 345/440 |
| 5,794,178 | A * | 8/1998 | Caid et al. ..................... 704/9 |
| 5,819,016 | A * | 10/1998 | Watanabe et al. ............ 345/419 |
| 6,366,284 | B1 * | 4/2002 | McDonald .................. 345/440 |
| 6,697,081 | B1 * | 2/2004 | Ito ............................. 345/619 |
| 6,707,454 | B1 * | 3/2004 | Barg et al. ................... 345/440 |
| 6,760,727 | B1 * | 7/2004 | Schroeder et al. ............. 707/10 |
| 6,943,793 | B2 * | 9/2005 | Bowser et al. ........... 345/440.2 |
| 7,257,778 | B2 * | 8/2007 | Kekki et al. .................. 715/848 |
| 2003/0080962 | A1 * | 5/2003 | Erickson et al. ............. 345/440 |
| 2003/0144868 | A1 * | 7/2003 | MacIntyre et al. ............. 705/1 |
| 2003/0214504 | A1 * | 11/2003 | Hao et al. .................... 345/440 |
| 2004/0126745 | A1 * | 7/2004 | Bell et al. .................... 434/201 |
| 2005/0102154 | A1 * | 5/2005 | Dodd et al. ..................... 705/1 |
| 2006/0059238 | A1 * | 3/2006 | Slater et al. ................. 709/206 |
| 2006/0161472 | A1 * | 7/2006 | Weild .......................... 705/10 |

FOREIGN PATENT DOCUMENTS

| JP | 2002-015095 | 1/2002 |
| JP | 2002-024283 | 1/2002 |
| JP | 2003-271659 | 9/2003 |

* cited by examiner

*Primary Examiner*—Xiao M Wu
*Assistant Examiner*—David T Welch
(74) *Attorney, Agent, or Firm*—Oliff & Berridge, PLC

(57) ABSTRACT

In a statistical variable display apparatus, first lengths along a first axis and second lengths along a second axis are determined. The first lengths are respectively allotted to first-type subgroups, and the second lengths are respectively allotted to the second-type subgroups. The apparatus displays the first-type subgroups arranged along the first axis to have the respective first lengths, the second-type subgroups arranged along the second axis to have the respective second lengths, and representations of acquired statistical variables correspondingly to a respective one of the first-type subgroups arranged along the first axis and a respective one of the second-type subgroups arranged along the second axis.

24 Claims, 16 Drawing Sheets

EXAMPLES OF SETTINGS OF BOUNDARIES (THRESHOLDS) BETWEEN CATEGORIES OF ADMINISTRATIVE STAFF AND NON-ADMINISTRATIVE STAFF

FIG. 6

EXAMPLE OF ORGANIZATIONAL STRUCTURE

| LAYER-1 | α DEPARTMENT | | | β DEPARTMENT | | | γ DEPARTMENT | | | |
|---|---|---|---|---|---|---|---|---|---|---|
| LAYER-2 | A SECTION | B SECTION | | C SECTION | D SECTION | E SECTION | F SECTION | G SECTION | | H SECTION | |
| LAYER-3 | 1 | 2 | 3 | 4 | 5 | 6 | 7 | 8 | 9 | 10 | 11 | 12 | 13 | 14 | 15 |

FIG. 7

EXAMPLES OF COMMUNICATION DATA

| TRANSMITTER USER ID | RECEIVER USER ID | MESSAGE ID | TRANSMISSION TIME |
|---|---|---|---|
| u1 | u2 | MSGID1 | t1 |
| u2 | u3 | MSGID2 | t2 |
| ... | ... | ... | ... |

FIG. 8

USER INFORMATION TABLE

| USER ID | MANAGERIAL POST | ASSIGNMENT (LEVEL-1) | ASSIGNMENT (LEVEL-2) | ASSIGNMENT (LEVEL-3) |
|---|---|---|---|---|
| u1 | t1 | s1 | s2 | s3 |
| u2 | t2 | s3 | s4 | s5 |
| ... | ... | ... | ... | ... |

FIG. 9

ASSIGNED GROUP TABLE

| DIVISION ID | DIVISION APPLELLATION |
|---|---|
| s1 | section1 |
| s2 | section2 |
| s3 | section3 |
| s4 | section4 |
| ... | ... |

FIG. 10

MANAGERIAL POST TABLE

| MANAGERIAL POST ID | MANAGERIAL POST |
|---|---|
| t1 | title1 |
| t2 | title2 |
| t3 | title3 |
| t4 | title4 |
| ... | ... |

<MODIFICATION>

DISPLAY WITH EQUAL SIZE

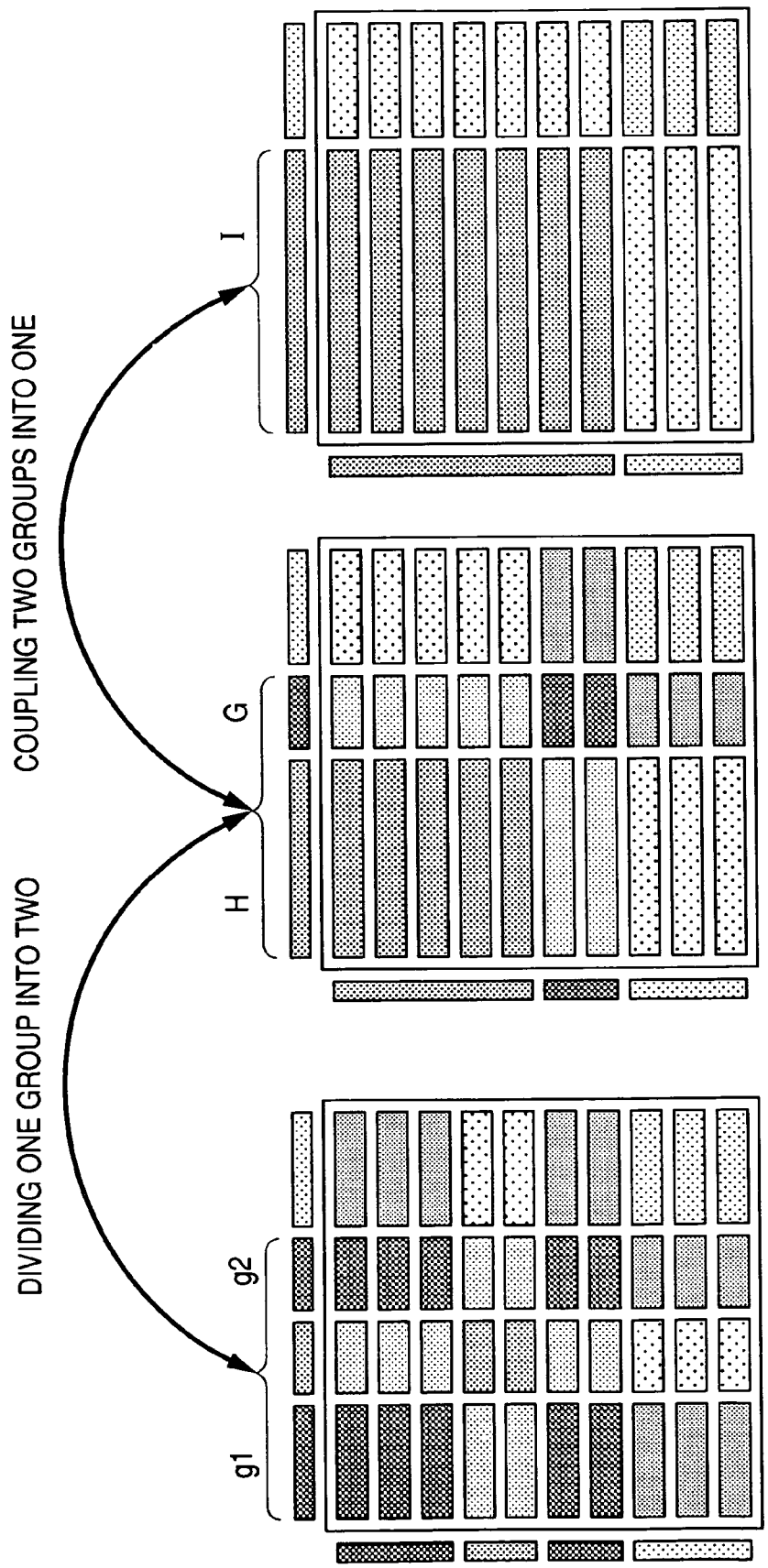

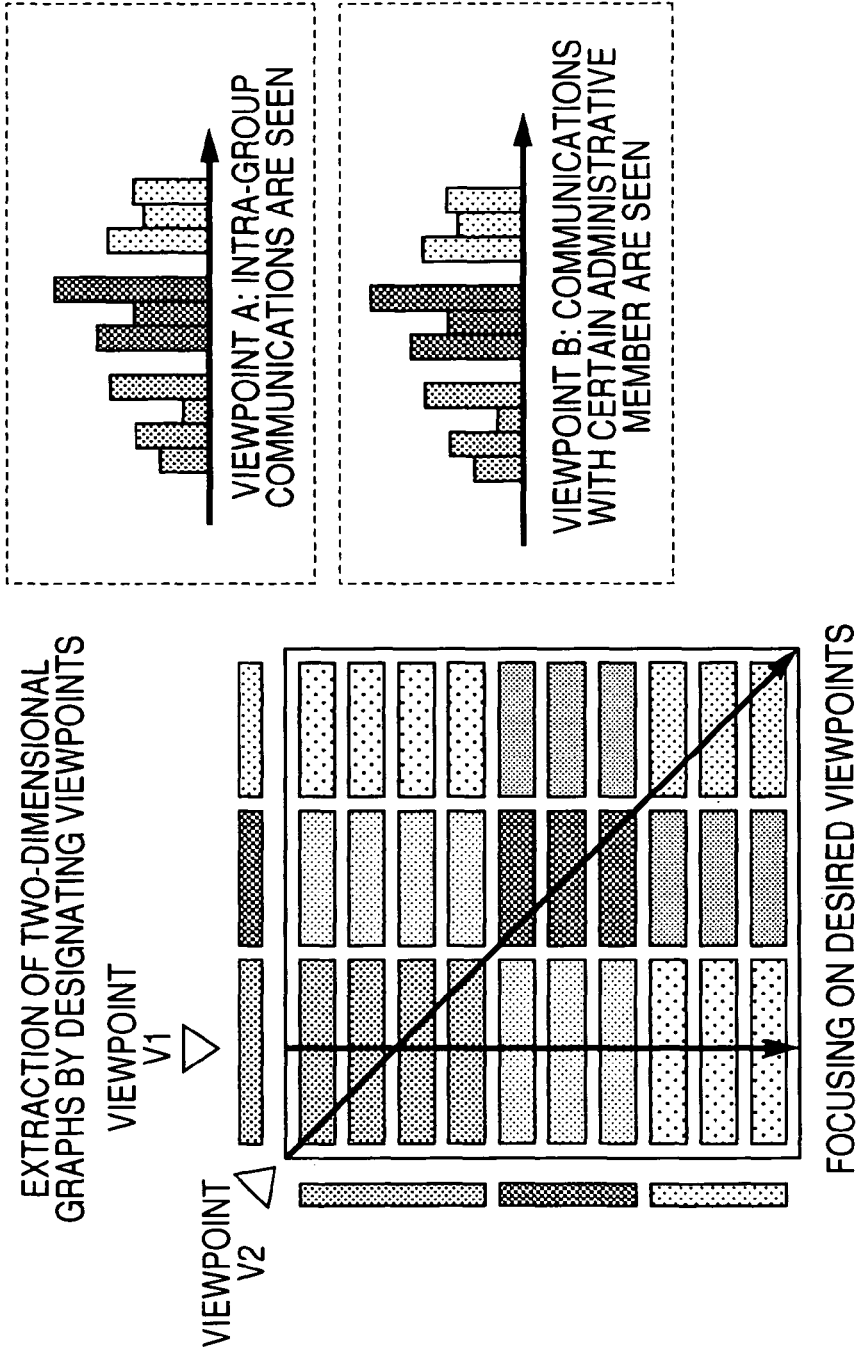

STATISTICAL VARIABLE DISPLAY APPARATUS AND METHOD, AND STORAGE MEDIUM STORING STATISTICAL VARIABLE DISPLAY PROGRAM

BACKGROUND OF THE INVENTION (i) Field of the invention

The present invention relates to technology for displaying a statistical variable, for example, an intra-organizational statistical variable. More particularly, it is suited to display the statistical variable between two different types of entities within an organization. Incidentally, the "entities" are persons or groups which are the constituent elements of the organization.

(ii) Description of the Related Art

In order to visualize the communications between persons, there have heretofore been proposed a plurality of methods in each of which the persons are set as nodes, while relevant values are displayed as arcs. With such a structure, the individual relations between the persons are precisely represented, but it becomes difficult to grasp the whole tendency of the communications, as the number of the persons to be handled increases.

Besides, in analyzing an organization typified by a general enterprise, it becomes important to analyze the communications between managerial posts of different numbers of persons as in the administrative staff and the non-administrative staff, with note taken of the relations between divisions or the like groups. With the structure which employs the nodes and the arcs, it is difficult to visualize such communications on the whole.

On the other hand, ordinary three-dimensional graphs have the problem that a certain element is concealed behind another, or that an overlooking viewpoint (a birds eye viewpoint) must be searched for, namely, that the graphs are inferiorly looked through.

It has been desired to grasp a statistical variable, for example, a communicational amount in a large organization, on the whole while a display based on the three-dimensional graphs is employed.

Incidentally, techniques to be stated below have been known as proposals relevant to the present invention.

Patent Document 1 proposes a technique wherein individual persons or things are grouped on the basis of their attribute information items and are displayed within group nodes, and the information items of connectional relations are offered by the nodes and arcs with the individual persons or things prevented from being specified. With this technique, intra- and inter-group communications can be represented, but the statistical variable of communications or the likes cannot be overlooked on the whole for a large-scale organization.

Patent Document 2 proposes a technique wherein the features of the connectional relations between two sorts of groups to-be-handled are displayed using nodes and arcs, in a manner to be easily overlooked. With this technique, the relations between persons and things (information items) can be represented, but the comparisons of intra- and extra-group communications, or the likes cannot be made.

Patent Document 3 proposes a technique wherein the connectional relations of persons among three categories are displayed using nodes and arcs, in a manner to be easily understood. With this technique, the three categories can be compared, but intra- and extra-group comparisons cannot be made.

Patent Document 1: JP-A-2002-15095
Patent Document 2: JP-A-2002-24283
Patent Document 3: JP-A-2003-271659

SUMMARY OF THE INVENTION

The present invention has been made considering the above circumstances.

This invention provides, as an illustrative, non-limiting embodiment, a statistical variable display apparatus comprising: subgroup acquisition means for acquiring first-type subgroups and second-type subgroups from plural groups; element acquisition means for acquiring first-type elements belonging to the first-type subgroups and second-type elements belonging to the second-type subgroups; statistical variable acquisition means for acquiring a statistical variable between each of the first-type elements and each of the second-type elements; first-arts-relating length determination means for determining first lengths along a first axis, the first lengths being respectively allotted to the first-type subgroups; second-axis-relating length determination means for determining second lengths along a second axis, the second lengths being respectively allotted to the second-type subgroups; and three-dimensional display means for displaying, in a three-dimensional coordinate system having the first axis, the second axis and a third axis, the first-type elements arranged within regions of the corresponding first-type subgroups that are arranged along the first axis to have the respective first lengths, the second-type elements arranged within regions of the corresponding second-type subgroups that are arranged along the second axis to have the respective second lengths, and graphical representations of the acquired statistical variables along the third axis, each of the graphical representations of the acquired statistical variables being disposed correspondingly to a respective one of the first-type elements arranged along the first axis and a reeve one of the second-type elements arranged along the second axis.

This invention provides, as an illustrative, non-limiting embodiment, a statistical variable display method comprising the steps of: acquiring first-type subgroups and second-type subgroups from plural groups; acquiring first-type elements belonging to the first-type subgroups and second-type elements belonging to the second-type subgroups; acquiring a statistical variable between each of the first-type elements and each of the second-type elements; determining first lengths along a first axis, the first lengths being respectively allotted to the first-type subgroups; determining second lengths along a second axis, the second lengths being respectively allotted to the second-type subgroups; and displaying, in a three-dimensional coordinate system having the first axis, the second axis and a third axis, the first-type elements arranged within regions of the corresponding first-type subgroups that are arranged along the first axis to have the respective first lengths, the second-type elements arranged within regions of the corresponding second-type subgroups that are arranged along the second axis to have the respective second lengths, and graphical representations of the acquired statistical variables along the third axis, each of the graphical representations of the acquired statistical variables being disposed correspondingly to a respective one of the first-type elements arranged along the first axis and a respective one of the second-type elements arranged along the second axis.

This invention provides, as an illustrative, non-limiting embodiment, a storage medium readable by a computer, the storage medium storing a program of instructions executable by the computer to perform a function for displaying statistical variables, the function comprising the steps of: acquiring first-type subgroups and second-type subgroups from plural groups; acquiring first-type elements belonging to the first-type subgroups and second-type elements belonging to the second-type subgroups; acquiring a statistical variable between each of the first-type elements and each of the second-type elements; determining first lengths along a first axis, the first lengths being respectively allotted to the first-type subgroups; determining second lengths along a second axis, the second lengths being respectively allotted to the second-type subgroups; and displaying, in a three-dimensional coordinate system having the first axis, the second axis and a third axis, the first-type elements arranged within regions of the corresponding first-type subgroups that are arranged along the first axis to have the respective first lengths, the second-type elements arranged within regions of the corresponding second-type subgroups that are arranged along the second axis to have the respective second lengths, and graphical representations of the acquired statistical variables along the third axis, each of the graphical representations of the acquired statistical variables being disposed correspondingly to a respective one of the first-type elements arranged along the first axis and a respective one of the second-type elements arranged along the second axis.

This invention provides, as an illustrative, non-limiting embodiment, a statistical variable display apparatus comprising: subgroup acquisition means for acquiring first-type subgroups and second-type subgroups by dividing each of plural groups into a respective one of the first-type subgroups and a respective one of the second-type subgroups; statistical variable acquisition means for acquiring a statistical variable between each of the first-type subgroups and each of the second-type subgroups; first-axis-relating length determination means for determining first lengths along a first axis, the first lengths being respectively allotted to the first-type subgroups; second-axis-relating length determination means for determining second lengths along a second axis, the second lengths being respectively allotted to the second-type subgroups, wherein the second-axis-relating length determination means determines the second length allotted to the respective one of the second-type subgroups based on the first length allotted to the respective one of the first-type subgroups; and display means for displaying the first-type subgroups arranged along the first axis to have the respective first lengths, the second-type subgroups arranged along the second axis to have the respective second lengths, and representations of the acquired statistical variables, each of the representations of the acquired statistical variables being disposed correspondingly to a respective one of the first-type subgroups arranged along the first axis and a respective one of the second-type subgroups arranged along the second axis.

This invention provides, as an illustrative, non-limiting embodiment, a statistical variable display apparatus comprising: subgroup acquisition means for acquiring first-type subgroups and second-type subgroups from plural groups; element acquisition means for acquiring first-type elements belonging to the first-type subgroups and second-type elements belonging to the second-type subgroups; statistical variable acquisition means for acquiring a statistical variable between each of the first-type elements and each of the second-type elements; first-axis-relating length determination means for determining first lengths along a first axis, the first lens being respectively allotted to the first-type subgroups; second-axis-relating length determination means for determining second lengths along a second axis, the second lengths being respectively allotted to the second-type subgroups; and display means for displaying, in a coordinate system having the first axis and the second axis, the first-type elements arranged within regions of the corresponding first-type subgroups that are arranged along the first axis to have the respective first lengths, the second-type elements arranged within regions of the corresponding second-type subgroups that are arranged along the second axis to have the respective second lengths, and representations of the acquired statistical variables, each of the representations of the acquired statistical variables being disposed correspondingly to a respective one of the first-type elements arranged along the first axis and a respective one of the second-type elements arranged along the second axis.

BRIEF DESCRIPTION OF THE DRAWINGS

Preferred embodiment(s) of the present invention will be described in detail based on the following figures, wherein:

FIG. 6 is a diagram for explaining an example of group selection based on an organizational layer in the above embodiment;

FIG. 7 is a diagram for explaining examples of communication data in the above embodiment;

FIG. 8 is a diagram for explaining an example of a user information table for use in the above embodiment;

FIG. 9 is a diagram for explaining an example of an assigned group table for use in the above embodiment;

FIG. 10 is a diagram for explaining an example of a managerial post table for use in the above embodiment;

FIG. 18 is a diagram for explaining grouping and segmentation in the above embodiment; and FIG. 19 is a diagram for explaining examples of two-dimensional displays in which viewpoints are designated, in the above embodiment.

DETAILED DESCRIPTION OF THE INVENTION

Now, an embodiment of the present invention will be described.

Figure 1:
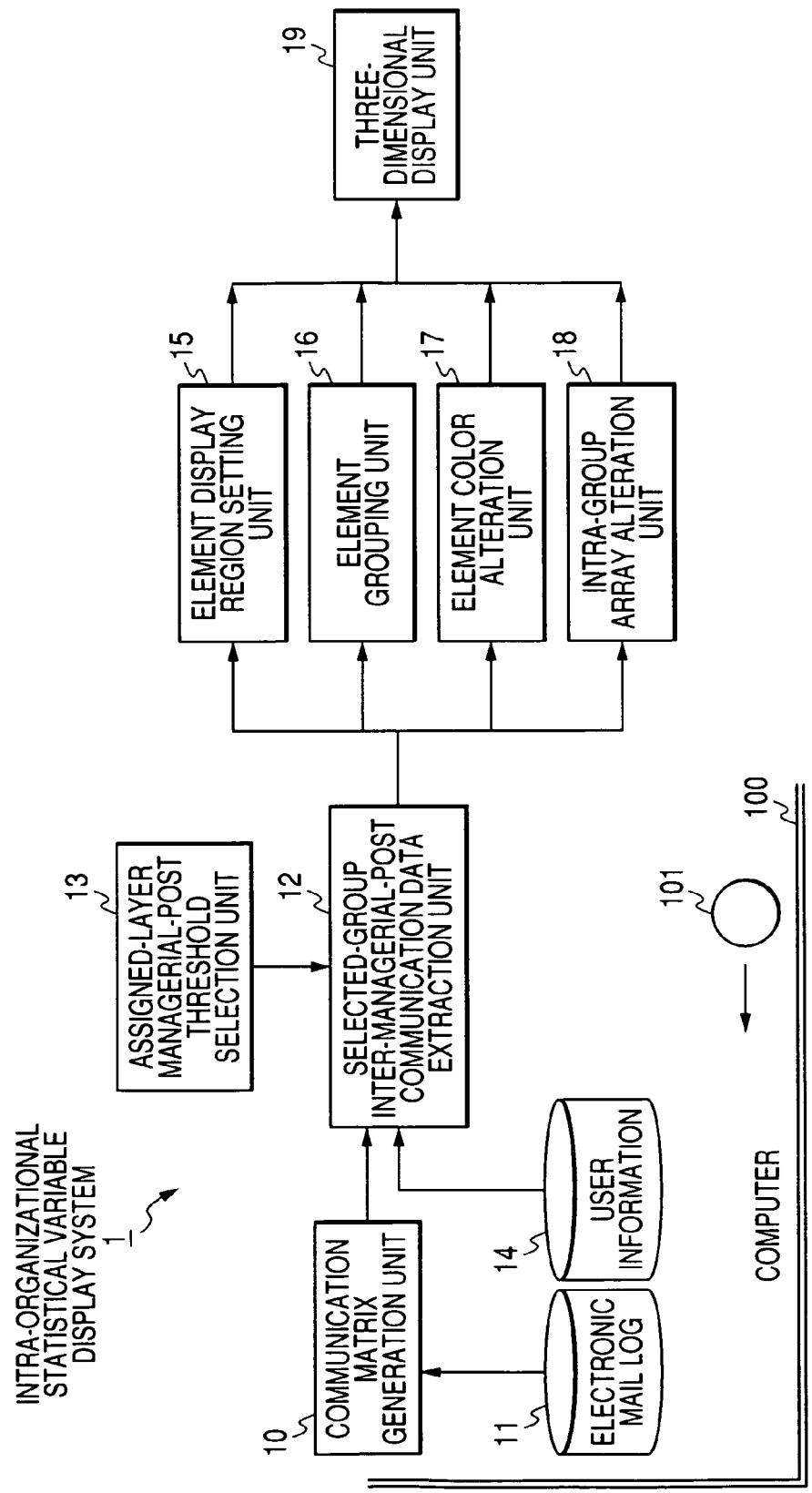
FIG. 1 is a block diagram generally showing an embodiment of the present invention.
Figure 4:
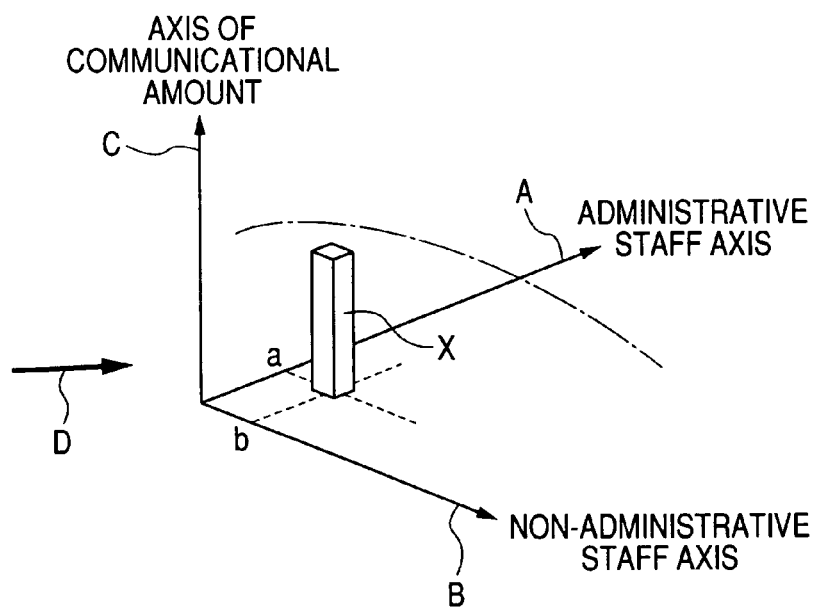
FIG. 4 is a model diagram for explaining a three-dimensional display in the above embodiment.

FIG. 1 generally shows an intra-organizational statistical information display system 1 according to the invention. In this example, communicational amounts (for example, frequencies) based on electronic mail as are reckoned between the administrative staff and the non-administrative staff are totalized and grasped with notice taken of groups. As shown in FIG. 4 by way of example, the employees or groups of the administrative staff are arranged on the axis A of the administrative staff, the employees or groups of the non-administrative staff are arranged on the axis B of the non-administrative staff, and the communicational amounts of the electronic mail between the entities are indicated on an axis C. The amount of the communications between the employee a of the administrative staff and the employee b of the non-administrative staff is represented by a graphical representation X. Although only one graphical representation part is illustrated in the example of FIG. 4, the communicational amounts between the individual entities are also represented by similar graphical representation parts, which are represented in compound fashion as schematically indicated by a dot-and-dash line. An analyzer can look at the graphical representation from any desired viewpoint (the direction of the origin as indicated by an arrow D). By the way, in the ensuing description, the employees will be sometimes called "users" because they are in the positions of the users of the electronic communications.

Besides, in this example, the intra-organizational statistical information display system 1 is incarnated by installing programs 101 on a computer 100, but the programs may well be installed on a client/server system. Functional blocks to be stated below are incarnated by causing the hardware resources and software resources of the computer to collaborate.

Referring to FIG. 1, the intra-organizational statistical information display system 1 is configured including a communication matrix generation unit 10, an electronic mail log storage unit 11, a selected-group inter-managerial-post communication data extraction unit 12, an assigned-layer managerial-post threshold selection unit 13, a user information storage unit 14, an element display region setting unit 15, an element grouping unit 16, an element color alteration unit 17, an intra-group array alteration unit 18 and a three-dimensional display unit 19.

The electronic mail log storage unit 11 retains communication data as shown in FIG. 7. The communication matrix generation unit 10 generates by referring to the electronic mail log storage unit 11, matrix data in which the communicational amounts (for example, frequencies) of respective user pairs are described as the components of matrices.

Figure 5:
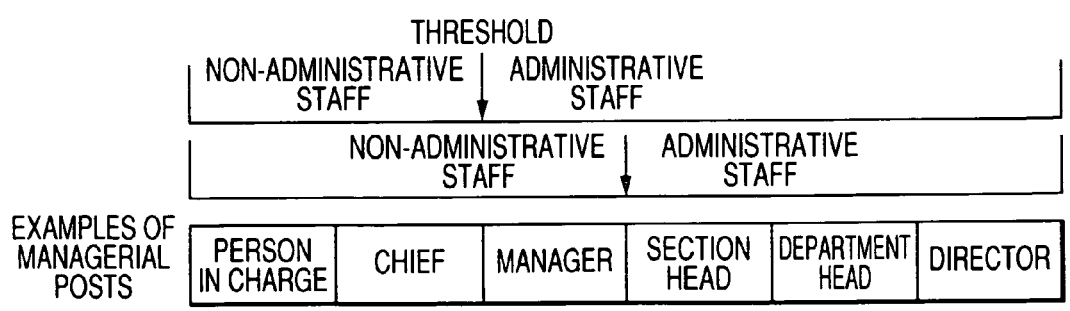
FIG. 5 is a diagram for explaining a managerial-post threshold setting in the above embodiment.

The assigned-layer managerial-post threshold selection unit 13 first determines an assigned layer shown in FIG. 6, on the basis of a predetermined user manipulation input (with a slide bar or the like), thereby to select a group, and secondly determines a managerial post threshold shown in FIG. 5, on the basis of a predetermined user manipulation input (with the slide bar or the like), thereby to determine the range of the administrative staff and that of the non-administrative staff.

In the example of FIG. 5, there are illustrated the case of setting the threshold between a chief and a manager, and the case of setting the threshold between the manager and a section head.

In the example of FIG. 6, when Layer-1 is selected, a group is set in department units; when Layer-2 is selected, a group is set in section units; and when Layer-3 is selected constituent member units form a group.

The selected-group inter-managerial-post communication data extraction unit 12 classifies and extracts the communications between the users of the non-administrative staff and those of the administrative staid in selected group units. Which of the selected groups each user belongs to, and whether he/she is a non-administrative member or an administrative member as stipulated by the threshold, can be determined by referring to a user information table (FIG. 8), an assigned group table (FIG. 9) and a managerial post table (FIG. 10).

Figure 11:
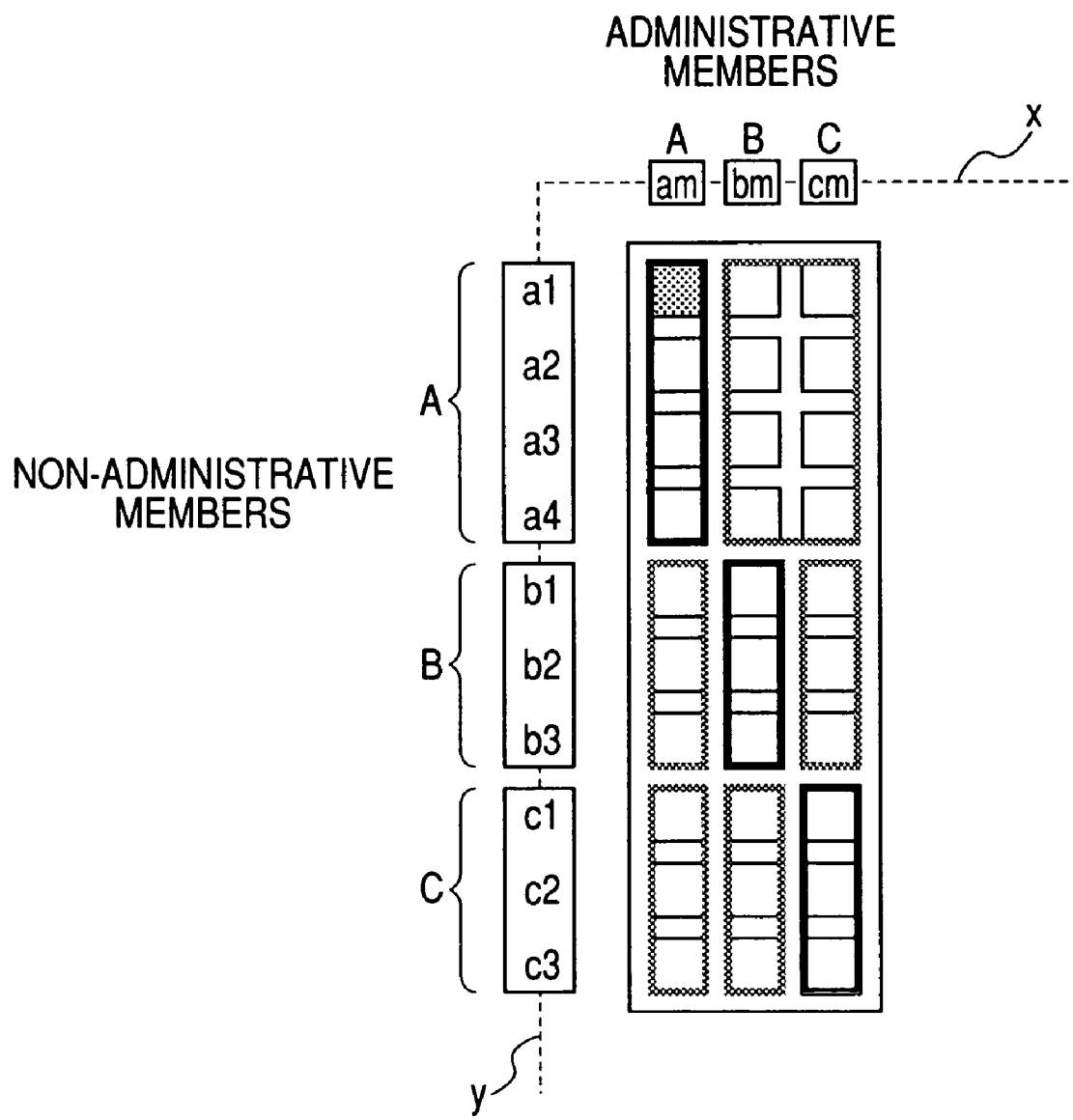
FIG. 11 is a diagram for explaining how to array the entities of the non-administrative staff and those of the administrative staff in the above embodiment.

In this example, as shown in FIG. 11, the entities of the administrative staff are arrayed on the axis of abscissas x, while the entities of the non-administrative staff are arrayed on the axis of ordinates y, and the graphical indication of the amount of communications as extends in the direction of the sheet of the drawing is given at the intersection position between the entity on the axis of ordinates and the entity on the axis of abscissas (FIG. 4). Especially, the entities are grouped and arrayed in this example. In the example of FIG. 11, employees who are non-administrative members a1, a2, a3 and a4, b1, b2 and b3, and c1, c2 and c3 assigned to respective groups A, B and C are successively a above, and employees am, bm and cm who are administrative members assigned to the respective groups A, B and C are arrayed rightwards from left.

Incidentally, a rectangle which is arranged at the intersection position between the entities (which is a regular square or an oblong, and as which one corresponding to the non-administrative staff user a1 and the administrative staff user am is indicated as a pear-skin ground by way of example) is the graphical representation of the communicational amount (refer to X in FIG. 4) as viewed from above. The same holds true in FIG. 12-FIG. 19 succeeding to FIG. 11.

Figure 2:
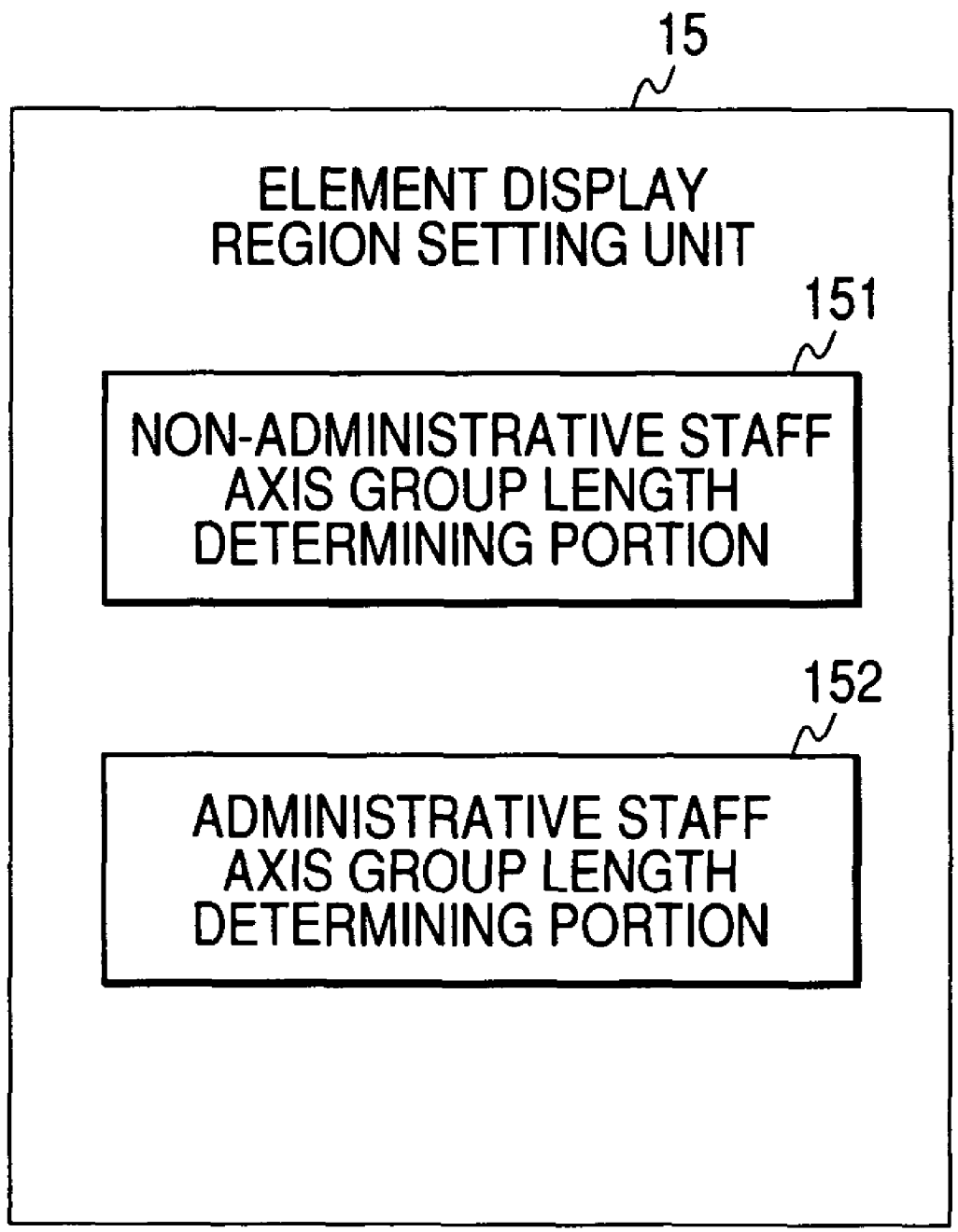
FIG. 2 is a diagram for explaining the essential portions of the above embodiment as functional blocks.

The element display region setting unit 15 determines the sizes of the display regions of entities. As shown in FIG. 2, the element display region setting unit 15 functionally includes a non-administrative staff axis group length determining portion 151 and an administrative staff axis group length determining portion 152. In this example, the sites of the display regions of the entities of the non-administrative staff (also termed "non-administrative staff axis group lengths") and those of the display regions of the entities of the administrative staff (also termed "administrative staff axis group lengths") are determined in group units. The sizes of the display regions of the groups of the non-administrative staff are basically determined by the numbers of the entities, namely, the employees who are included in the groups. In an example shown on the left side of FIG. 12, the numbers of the constituent members of the groups of the non-administrative staff are 4, 3 and 3 from above, and hence, the sizes of the display regions are at 4:3:3. In this display example, one constituent member is included in each of all the groups of the administrative staff, and hence, the size of each display region corresponds to one constituent member.

Figure 12:
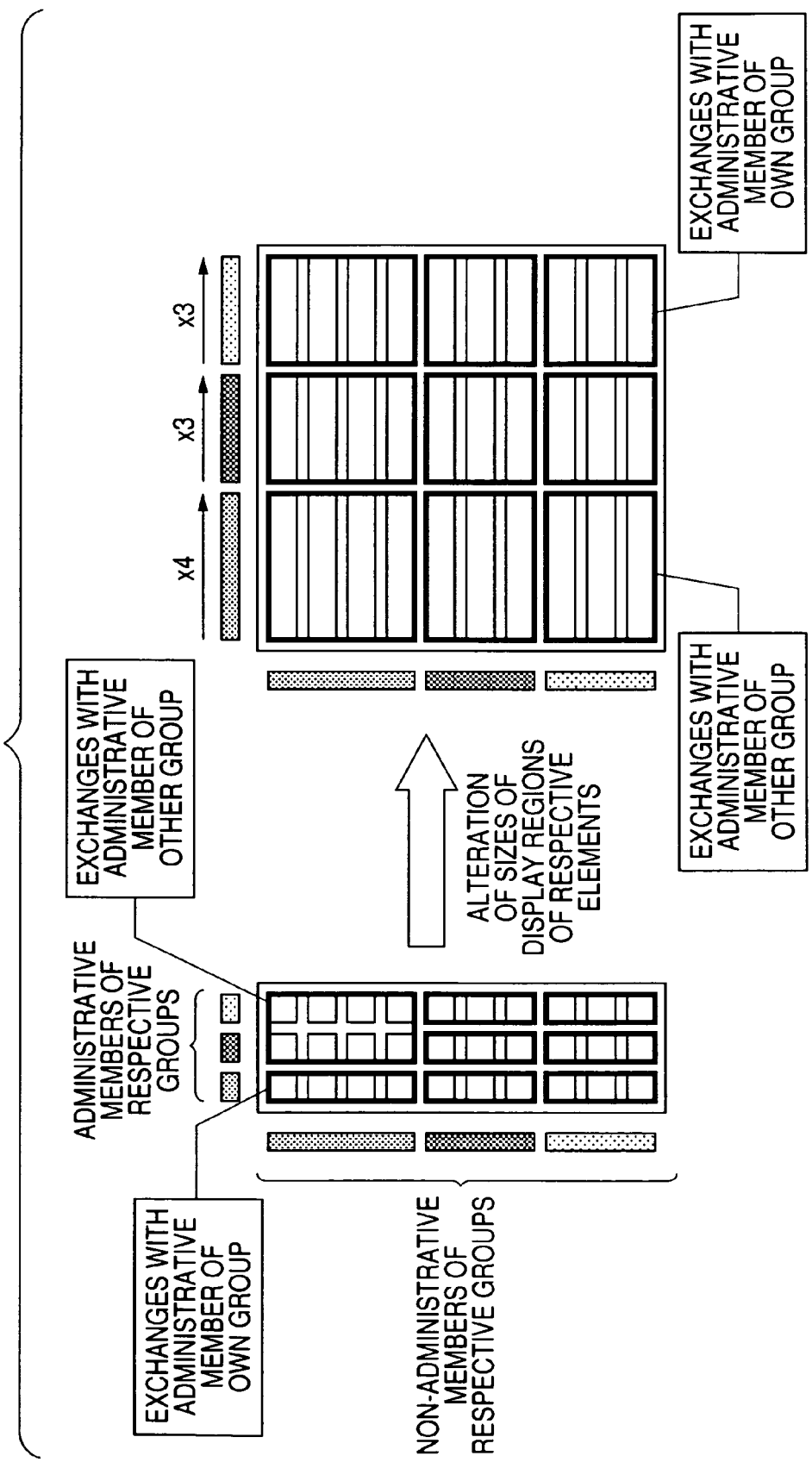
FIG. 12 is a diagram for explaining a basic display technique in the above embodiment.

In this embodiment, the display example on the left side of FIG. 12 is adoptable, but a display aspect on the fight side of FIG. 12 is selected as a favorable display aspect. In the favorable example on the right side of FIG. 12, the display of the entities of the non-administrative staff is the same as in the display example on the left side of FIG. 12. The display of the entities of the administrative staff, however, is presented to be equivalent to the sizes of the display regions of the entities of the non-administrative staff of the same groups, irrespective of the numbers of the group constituent members. In this example, the sizes of the display regions of the non-administrative staff are of 4, 3 and 3 in succession from the uppermost group, and those of the display regions of the administrative staff are similarly set at 4, 3 and 3 in succession from the leftmost group. Thus, the communicational amounts between the non-administrative members and administrative members of the same groups can be arranged as diagonal components and can be easily grasped.

The element display region setting unit 15 determines the sizes of the display regions from the number of the constituent members of the non-administrative staff and that of the constituent members of the administrative staff of the groups as shown at the left part of FIG. 12, and it typically determines the display regions of both the non-administrative staff and the administrative staff form the numbers of the constituent members of the non-administrative staff of the groups as shown at the right part of FIG. 12.

The element grouping unit 16 defines the entities (employees or groups) of the non-administrative staff or the entities (employees or groups) of the administrative staff as one group by putting them together. An example of the grouping will be explained later.

The element color alteration unit 17 alters an element color. An example of the color alteration will also be explained later.

The intra-group array alteration unit 18 alters the array of entities within a group, in accordance with a communicational amount by way of example. An example of the array alteration will also be explained later.

The element groping unit 16, element color alteration unit 17 and intra-group array alteration unit 18 are additionally configured at option, but they may well be incorporated as standard functions.

The three-dimensional display unit 19 presents a three-dimensional graphics display on the basis of display dimensions determined by the element display region setting unit 16, etc., and a communicational amount extracted by the selected-group inter-managerial-post communication data extraction unit 12 (refer to FIG. 4).

Figure 3:
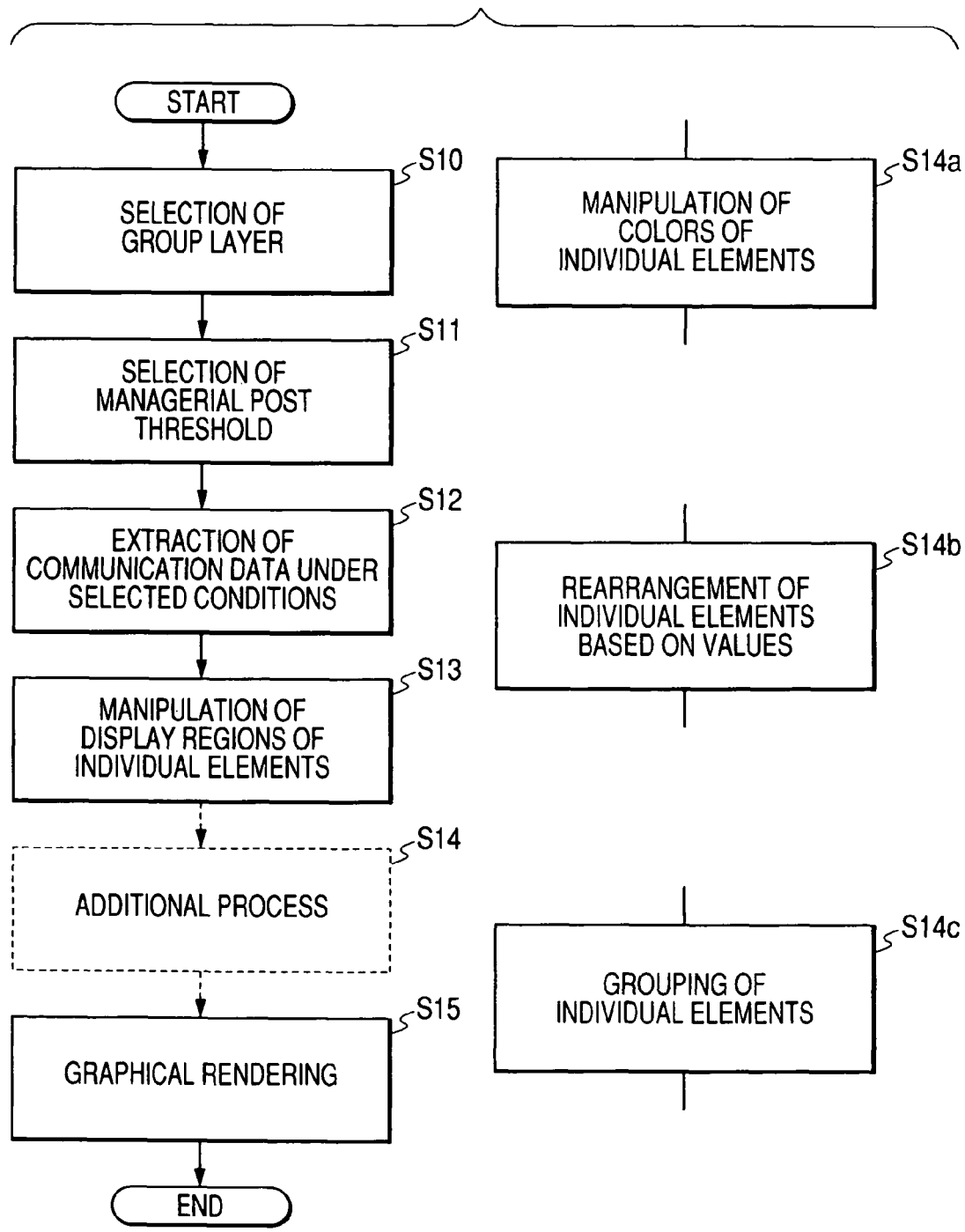
FIG. 3 is a flow chart for explaining an operating example of the above embodiment.

FIG. 3 is for explaining the operation of this embodiment. Referring to FIG. 3, a group layer is first selected on the basis of the selection of a user or by default (S10). Subsequently, a managerial post threshold is selected on the basis of the selection of the user or by default (S11). Communication data are extracted and classified under selected conditions (S12). The display regions of individual elements (entities) are set (S13). Concretely, the sizes and arrays of the regions are formed in group units. Thereafter, any of optional additional processes is performed (S14). The optional additional processes are a color manipulation for the individual elements (S14*a*), a rearrangement based on the values of the individual elements (S14*b*), and the grouping of the individual elements (S14*c*). Thereafter, graphical rendering as schematically shown in FIG. 4 is performed (S15).

Next, the details of the options of display aspects will be described.

FIG. 12 shows an example in which the display regions of the employees of the administrative staff are adapted to those of the employees of the non-administrative staff. On the left side of FIG. 12, the display regions of the employees (groups) of the administrative staff are displayed in accordance with the numbers of the constituent members thereof (in this example, each of the groups of the administrative staff is constituted by one member). Since the employees of the non-administrative staff are usually much larger in number than those of the administrative staff, a display which is vertically elongate as viewed in the figure is presented, and the intra-group relations cannot be clearly grasped. In contrast, at the right part of FIG. 12, the display regions of the employees of the administrative staff are equalized to those of the non-administrative staff assigned to the same groups. That is, the display regions of the administrative staff are set at sites multiplied by the numbers of the constituent members assigned to the same groups. In this example, the sizes are respectively multiplied by 4, 3 and 3 in succession from left.

Figure 13:
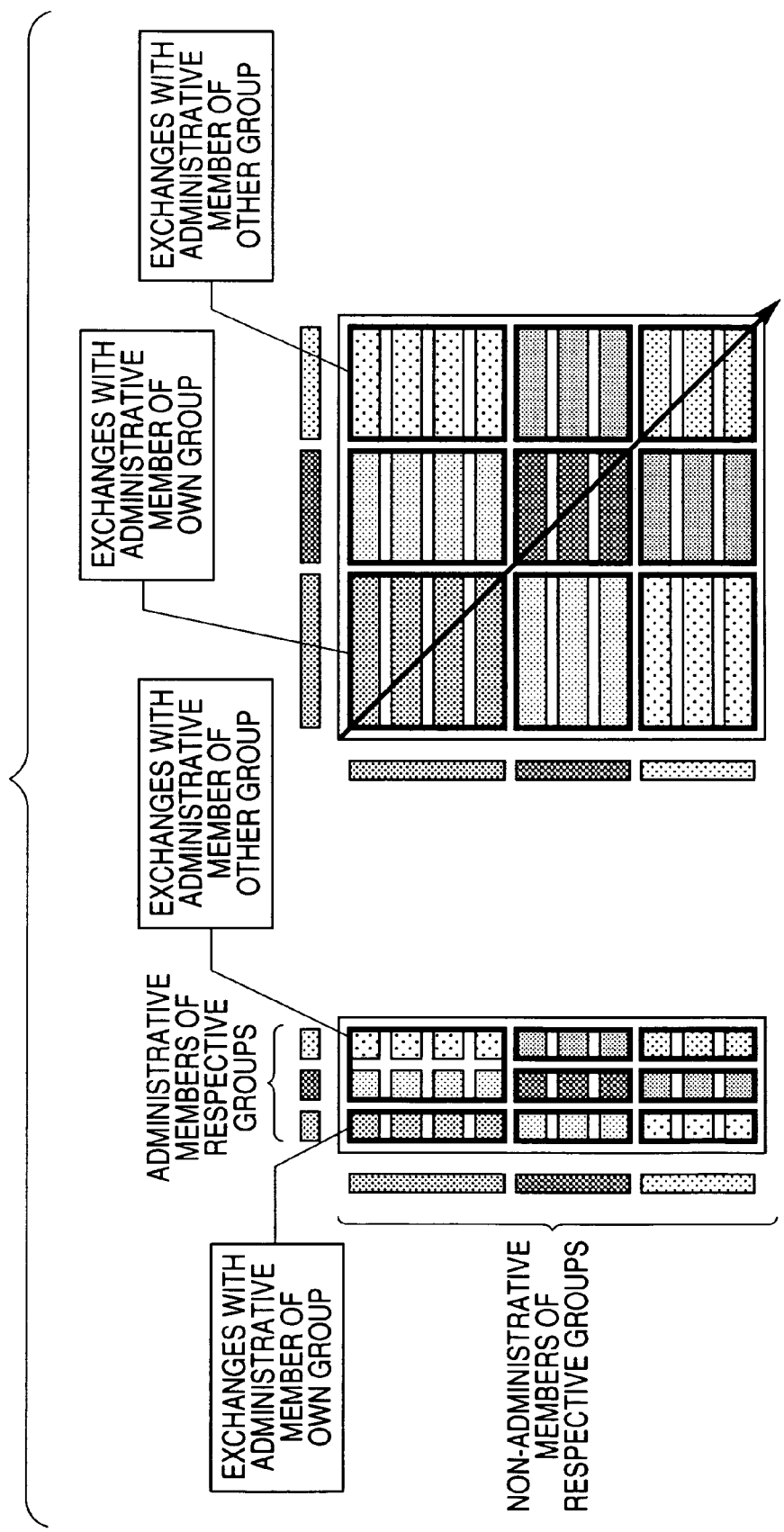
FIG. 13 is a diagram for explaining a merit owing to the basic display technique in the above embodiment.

As a result, the communications between the non-administrative staff and the administrative staff within the same groups are arranged as the diagonal components of the display of the right part and are easily grasped as clearly shown in FIG. 13.

Figure 14:
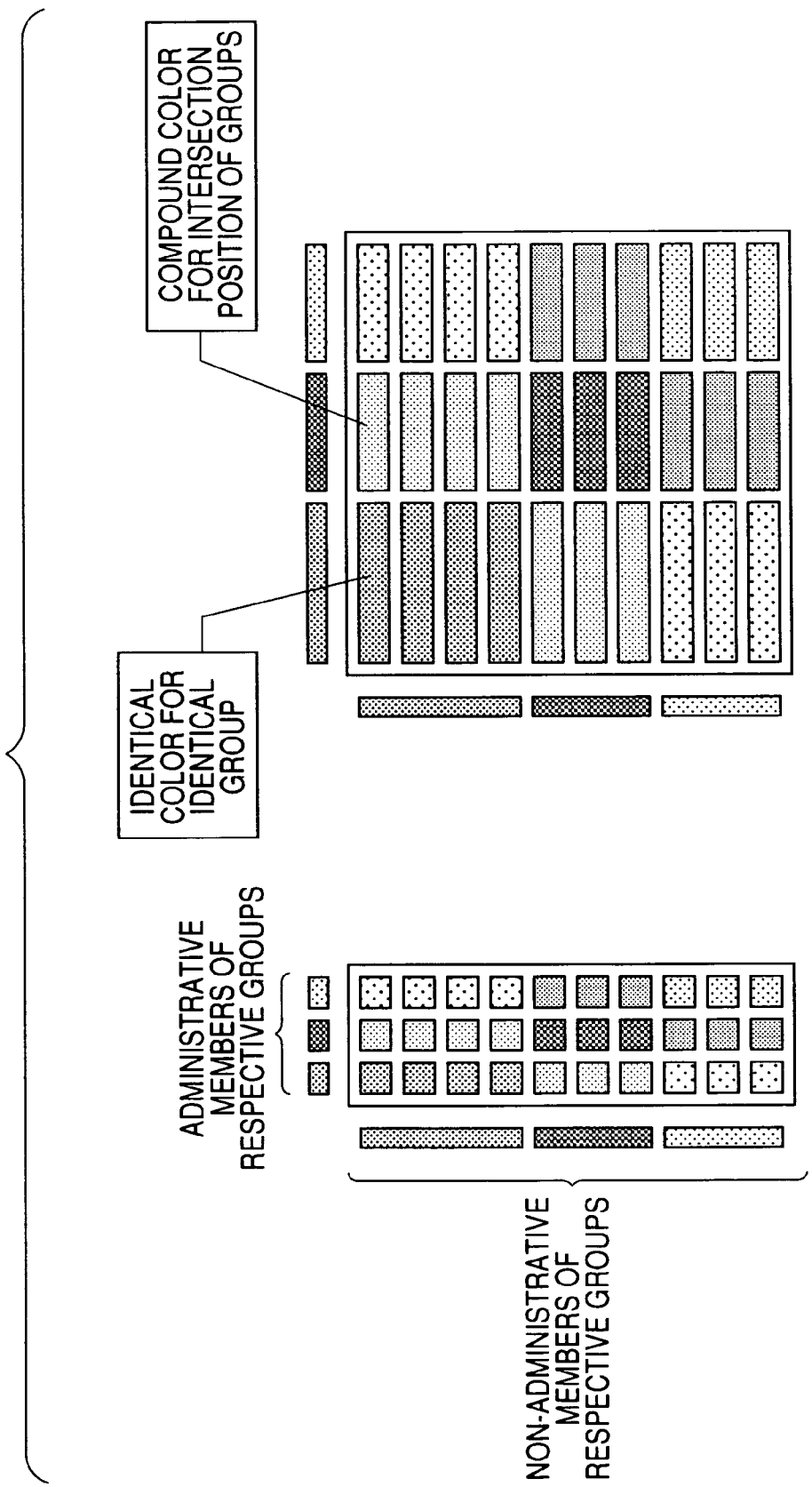
FIG. 14 is a diagram for explaining a display technique in which the classification of groups by coloring is included, in the above embodiment.

FIG. 14 shows the classification of groups by coloring. The entities of the non-administrative staff and those of the administrative staff assigned to the respective groups are tinged with the same colors. Further, the amounts of communications at the intersection positions between the respective groups are tinged with the same colors because the communications are performed between the same groups. Communications performed between the different groups are tinged with colors which are obtained by adding up the colors of the respective groups. The graphs of the amounts of the communications of diagonal components are in the same colors as those of the corresponding groups, whereas the graphs of the amounts of the communications of the other components are in the colors which are obtained by adding the colors of respectively two of the groups.

The left side of FIG. 14 consists in that the grasp of the communicational amounts is facilitated by tingeing the respective groups, and the right side thereof consists in that the technique of adjusting the sizes of the display regions as shown in FIG. 12 or FIG. 13 is also employed. According to the aspect on the right side of FIG. 14, the diagonal components can be easily grasped, and the relations between the groups can be understood in an orderly manner owing to the classification by coloring.

Figure 15:
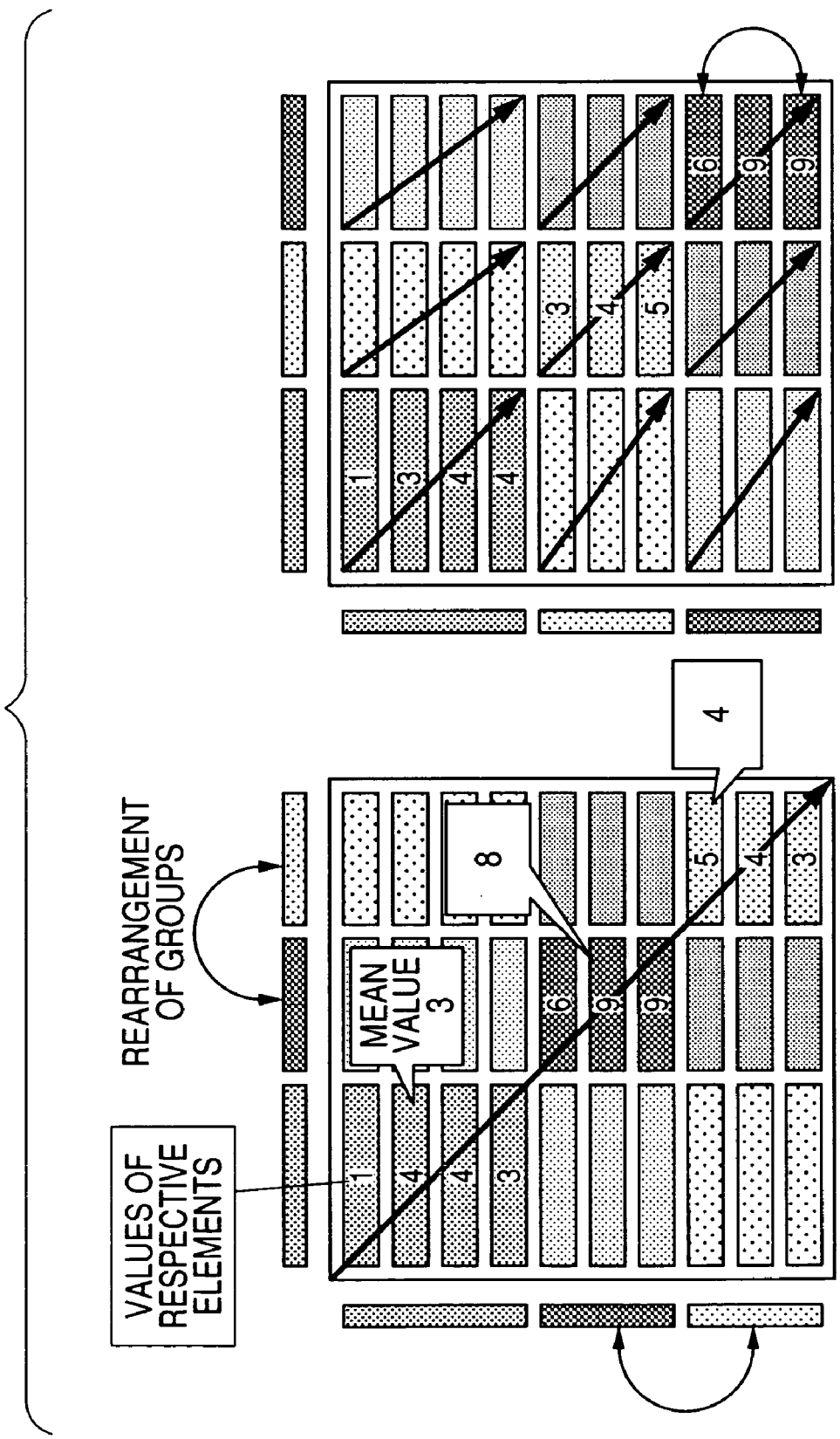
FIG. 15 is a diagram for explaining a display technique which is based on rearrangement, in the above embodiment.

FIG. 15 shows an example of a technique in which the arrangement of entities is altered. In this example, ruggedness is removed, whereby a part is restrained from hiding another part. Concretely, groups are rearranged in an array in which the mean values of the communicational amounts of the groups increase monotonously as the viewpoint of the analyzer becomes remoter, and constituent members are rearranged in an array in which the mean values within a group increase monotonously as the viewpoint of the analyzer becomes remoter.

In the example shown at the left part of FIG. 15, the group having a mean value of 8 lies on this side of the group having a mean value of 4, and hence, the groups are rearranged so that mean values may increase monotonously as 3, 4 and 8. Thereafter, the constituent members are rearranged so that mean values may increase monotonously within each group. In the left upper group at the left part of FIG. 15, the constituent members having mean values of 1, 4, 4 and 3 are arrayed, and the graph of the mean value of 3 is hidden by that of the mean value of 4. Therefore, the constituent members are rearranged in the order of the mean values of 1, 3, 4 and 4 as shown at the right part of FIG. 15.

Thus, the hidden graphical parts are decreased, and the whole display can be reliably grasped.

Figure 16:
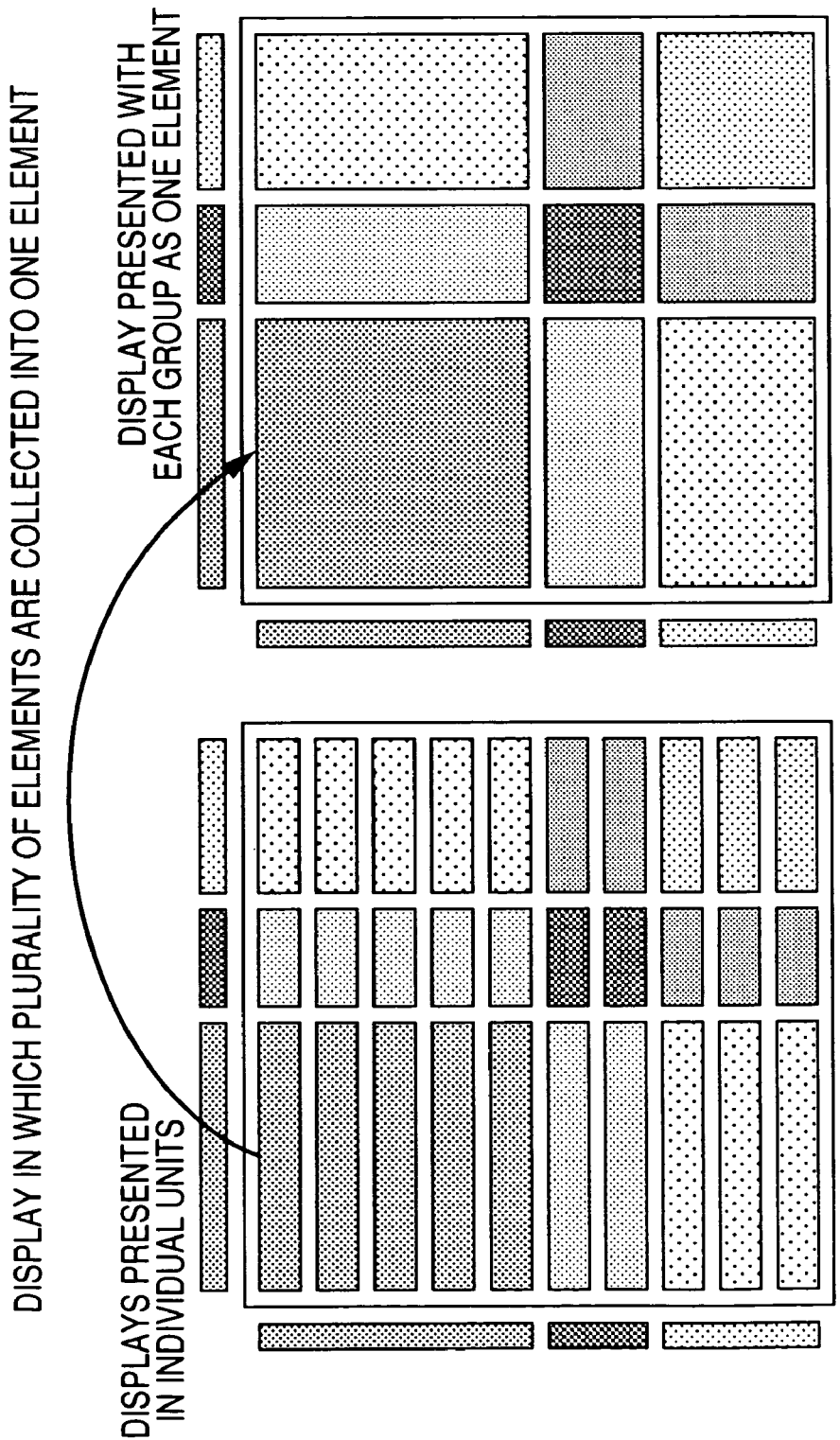
FIG. 16 is a diagram for explaining a display technique which is based on group units, in the above embodiment.
Figure 17:
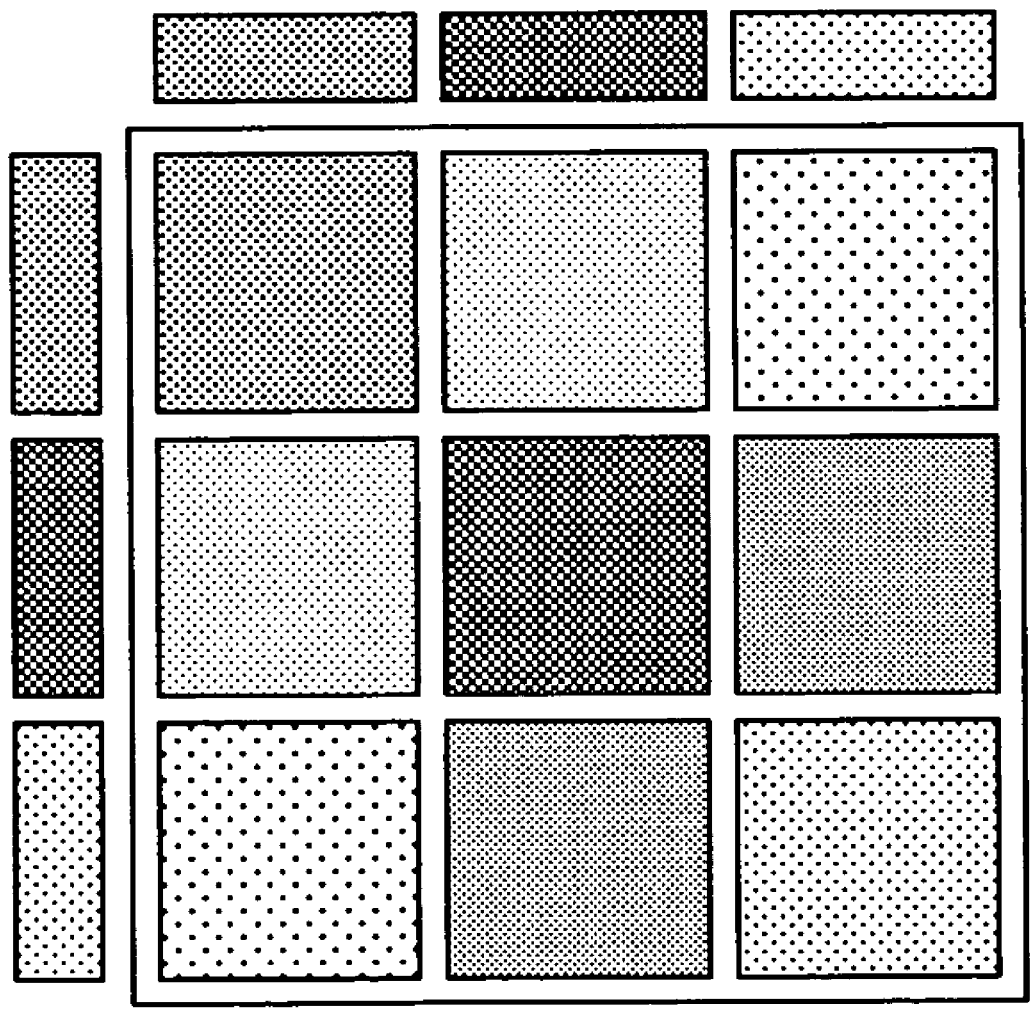
FIG. 17 is a diagram for explaining a modification to the display technique in FIG. 16.

FIG. 16 shows a display technique in which entities are collectively displayed. In the example of FIG. 16, a plurality of elements are collected as one element in group units, whereby the whole display can be easily grasped. In a case where the communicational amounts of the respective constituent members of each group are to be analyzed, individual displays may be selected so as to return to a display aspect on the left side of FIG. 16. By the way, in a case where importance is not attached to the individualities of the constituent members of each group, display regions may well be set at equal sizes irrespective of the numbers of the constituent members of respective groups, as shown in FIG. 17.

FIG. 18 shows a display technique in which groups are put together into a larger group, or in which a group is divided contrariwise. In the example of FIG. 18, the group G of the administrative staff in a middle display is divided into groups g1 and g2 in a left display. Conversely, the groups G and H of the administrative staff in the middle display are coupled into a group I at a right display part. In this way, how displays are changed by altering the granularities of the display elements is analyzed, whereby the characteristics of an organization can be grasped.

FIG. 19 shows an example in which viewpoints are set so as to grasp the features of the amounts of communications form the viewpoints. In the example of FIG. 19, the communicational amounts are analyzed from a viewpoint V1 with the group of the administrative staff fixed, and from a viewpoint V2 of diagonal components. From the viewpoint V1, communications with a specified administrative member can be grasped across groups. On the other hand, from the viewpoint V2, the communications between the administrative members and non-administrative members of respective groups can be grasped. In this example, the communicational amounts can be displayed in two dimensions, not in three dimensions, by setting the viewpoint.

Incidentally, although the frequencies of the communications of the electronic mail are the subject for the display in the above embodiment, a subject for display may well be the accumulated sizes of the bodies of the electronic mail, the numbers of annexed files, the accumulated sizes of the annexed files, or the frequencies or sites of instant messages. Besides, the electronic communications are not restrictive, but the accumulated time lengths of conversations which are exchanged between concerned persons, or time periods for which the concerned persons lie in common places graspable by employing sensor technology, may well be set as the amounts of communications as long as they can be recorded.

Besides, although the communicational amounts between respective entities are indicated by individual graphical representations (square pillars, circular cylinders, or the likes), the whole communicational amount may well be displayed by a curved surface which contains coordinates indicated by the communicational amounts.

As discussed above, in an illustrative, non-limiting example, in a case where one large organization such as a general organizational structure is divided into a plurality of groups, where each of the groups is subdivided into two parts such as the administrative staff and the non-administrative staff, and where the members of the administrative staff and those of the non-administrative staff are not equal in number, communications within the groups and among the groups are visualized by the three axes of an administrative staff axis, a non-administrative staff axis and a relevant value axis in three dimensions in order to overlook them on the whole.

Besides, one or more of display techniques to be stated below is/are adopted.

(1) In the aggregates of respective groups designated using group information, the sizes of the regions of individual elements are optimally altered.

(2) In the aggregates of respective groups designated using group information, the colors of individual elements are optimally altered.

(3) The arrays of groups are optimally altered in accordance with the numbers of the exchanges of respective groups designated using group information, in order to avoid a difficult observation for such a reason that elements are hidden in a manner peculiar to a three-dimensional display.

(4) In the aggregates of respective groups designated using group information, individual elements are grouped or fractionalized, thereby to alter the granularities of displays.

(5) Graphical representations are extracted from any desired viewpoint so as to be capable of focusing them.

In the illustrative, non-limiting example, three-dimensional graphs are transformed, or defined groups are classified by coloring or rearranged, whereby communications especially in a large-scale organization are permitted to be grasped on the whole.

Especially in analyzing an organization typified by a general enterprise, it is important to analyze the communications between managerial posts of different numbers of persons as in the administrative staff and the non-administrative staff with note taken of the relations between divisions and the like groups. According to the illustrative, non-limiting example, it is permitted to visualize the amounts of such communications on the whole in the organization of large scale.

According to an illustrative, non-limiting embodiment, a statistical variable display apparatus wherein elements of first type as belong to first-type subgroups of each of a plurality of groups within an organization are divided every corresponding subgroup and are displayed along a first axis, elements of second type as belong to second-type subgroups of each of the plurality of groups are divided every corresponding subgroup and are displayed along a second axis, and graphical representations of a predetermined statistical variable between the respective elements of the first type and the respective elements of the second type are displayed along a third axis; is provided with statistical variable acquisition means for acquiring values of the statistical variable between the respective elements of the first type and the respective elements of the second type; first-axis-relating length determination means for determining lengths along the first axis as are allotted to the respective subgroups of the first type; second-axis-relating length determination means for determining lengths along the second axis as are allotted to the respective subgroups of the second type; and three-dimensional display means for displaying the respective first-type elements which belong to the subgroups of the first type and which are arranged in a row within respective length regions of the first-type subgroups juxtaposed along the first axis, the respective second-type elements which belong to the subgroups of the second type and which are arranged in a row within respective length regions of the second-type subgroups as form a line so that intersection positions with the length regions of the corresponding first-type subgroups may be arranged as diagonal components, and the graphical representations of the statistical variable, in a three-dimensional coordinate system which consists of the first axis, the second a and the third axis, on the basis of the statistical variable values acquired by the statistical variable acquisition means, the first-axial lengths allotted to the first-type subgroups as have been determined by the first-axis-relating length determination means, and the second-axial lengths allotted to the second-type subgroups as have been determined by the second-axis-relating length determination means.

In this embodiment, the first axis which corresponds to the elements of the first type, for example, non-administrative members, and the second axis which corresponds to the elements of the second type, for example, administrative members can be lengthened or shortened to set dimensions, and all the graphical representations of the statistical variable can be displayed so as to be easily overlooked.

In this embodiment, the second-axis-relating length determination mean determines the second-axial lengths which are allotted to the respective corresponding subgroups of the second type, on the basis of the first-axial lengths which are allotted to the respective subgroups of the first type. Thus, the statistical variable values between the first-type elements and the second-type elements of the same groups are displayed as the diagonal components, and they can be easily grasped.

In this case, the ratio between the first-axial lengths which are allotted to the respective subgroups of the first type and the second axial lengths which are allotted to the respective corresponding subgroups of the second type should preferably be set to be constant. Further, the ratio should preferably be set at 1:1.

Besides, the first-axis-relating length determination means should preferably set the first-axial lengths which are allotted to the respective subgroups of the first type, at lengths which correspond to the numbers of the elements of the subgroups of the first type.

Besides, the arrangement of those elements within each of the subgroups whose statistical variable values are displayed should preferably be changed so that the statistical variable values may change monotonously along the array of the elements. Also, the arrangement of the length regions of the subgroups of the first type and the arrangement of the length regions of the subgroups of the second type should preferably be changed so that the statistical variable values may change monotonously along the arrays of the length regions. Thus, it is possible to restrain part of the graphical display from being hidden.

Besides, the optical attribute of the graphical display of the statistical variable should preferably be changed in accordance with the sorts of the groups. The optical attribute is, for example, colors. Preferably, the colors of the respective groups are set beforehand, the statistical variable values between the subgroups of the identical group are tinged with the color of the corresponding group, and the statistical variable values between the subgroups of the two different groups are tinged with the color which is obtained by adding the colors respectively allotted to the two groups.

The statistical variable values may well be displayed in subgroup units, as to at least either of the subgroups of the first type and the subgroups of the second type, whereby the statistical variable values can be displayed in group units. At least two of the groups may well be put together and then displayed.

Besides, the graphical representations of the statistical variable may well be displayed in two dimensions, with a display surface being a flat surface which extends along the third axis. In this case, the flat surface extending along the third axis extends along the diagonal components of the first axis and the second axis. Alternatively, the flat surface extending along the third axis extends along one of the first axis and the second axis. Thus, the statistical variable values can be grasped from a desired viewpoint.

Besides, it is allowed to dispose boundary setting means for setting a boundary between a first subgroup and a second subgroup. In a case, for example, where each of the groups is divided into two subgroups in accordance with managerial posts, how the statistical variable values change can be grasped while the way of the division is successively changed.

Typically, the first subgroup consists of the elements which have managerial posts of non-administrative staff, and the second subgroup consists of the elements which have managerial posts of administrative staff. Of course, the first subgroup may well correspond to the administrative staff, and the second subgroup to the non-administrative staff.

Besides, it is allowed to further dispose grouping setting means for setting the division of the groups within the organization. The grouping may well be performed by specifying the individual elements or the elements as the groups. In a case where the organization is hierarchized, the division of the groups may well be performed by designating hierarchical levels.

The statistical variable is typically the amount of electronic communications, but the invention is not restricted thereto. The electronic communications are, for example, electronic mail items or instant messages, the amount of which is the frequency or accumulated size thereof, but the invention is not restricted thereto.

Besides, according to another illustrative, non-limiting embodiment a statistical variable display apparatus wherein fist-type subgroups of each of a plurality of groups within an organization are displayed along a first axis, second-type subgroups of each of the plurality of groups are displayed along a second axis, and values of a predetermined statistical variable between the subgroups of first type and the subgroups of second type are displayed along a third axis, consists in that lengths along the second axis as are allotted to the respective corresponding subgroups of the second type are determined on the basis of lengths along the first axis as re allotted to the respective subgroups of the first type.

In this embodiment, the first axis and second axis can form lines, and a display of easy observation can be offered.

Besides, according to still another illustrative, non-limiting embodiment, a statistical variable display apparatus wherein elements of first type as belong to first-type subgroups of each of a plurality of groups are divided every corresponding subgroup and are displayed along a first axis, elements of second type as belong to second-type subgroups of each of the plurality of groups are divided every corresponding subgroup and are displayed along a second axis, and representations of a predetermined statistical variable between the respective elements of the first type and the respective elements of the second type are displayed along a third axis; is provided with statistical variable acquisition means for acquiring values of the statistical variable between the respective elements of the first type and the respective elements of the second type; first-axis-relating length determination means for determining lengths along the first axis as are allotted to the respective subgroups of the first type; second-axis-relating length determination means for determining lengths along the second axis as are allotted to the respective subgroups of the second type; and three-dimensional display means for displaying the respective first-type elements which belong to the subgroups of the first type and which are arranged in a row within respective length regions of the first-type subgroups juxtaposed along the first axis, the respective second-type elements which belong to the subgroups of the second type and which are arranged in a row within respective length regions of the second-type subgroups juxtaposed along the second axis, and the representations of the statistical variable, in a coordinate system which consists of the first axis and the second axis, on the basis of the statistical variable values acquired by the statistical variable acquisition means, the first-axis lengths allotted to the first-type subgroups as have been determined by the first-axis-relating length determination means, and the second-axial lengths allotted to the second-type subgroups as have been determined by the second-axis-relating length determination means.

According to this embodiment, the statistical variable can be made easy of observation by varying the axial lengths.

The statistical variable relates typically to the organization, but it may relate to anything which can be grouped and which has two attributes. The statistical variable may well relate to commodities in a market, people in a society or the like, and it is applicable to various other matters, events and things.

Although the statistical variable is typically the graphical representations displayed along the third axis, they are not restrictive, but the statistical variable may well be displayed by numerical values, densities or color attributes. Both the two-dimensional coordinate display and the three-dimensional coordinate display are possible.

Besides, in this embodiment, the intersection positions between the length regions of the respective subgroups of the first type and the length regions of the respective subgroups of the second type as correspond to the respective first-type subgroups should preferably be arranged as diagonal components.

Incidental, the invention can be incarnated, not only as an apparatus or a system, but also as a method. Besides, it is a matter of course that part of such an invention can be configured in the form of software. It is also natural that a software product which is employed for causing a computer to run such software is covered within the technical scope of the invention.

The above and other aspects of the invention are defined in the appended claims.

The entire disclosure of Japanese Patent Application No. 2005-090049 filed on Mar. 25, 2005 including specification, claims, drawings and abstract is incorporated herein by reference in its entirety.

The invention claimed is:

1. A statistical variable display apparatus comprising:
   a subgroup acquisition unit that acquires first-type subgroups and second-type subgroups from plural groups;
   an element acquisition unit that acquires first-type elements belonging to each first-type subgroup and second-type elements belonging to each second-type subgroup;
   a statistical variable acquisition unit that acquires a statistical variable between each of the first-type elements and each of the second-type elements;
   a first-axis-relating length determination unit that determines first lengths along a first axis, the first lengths being respectively allotted to the first-type subgroups, wherein the first lengths are variable;
   a second-axis-relating length determination unit that determines a second length, along a second axis, allotted to each second-type subgroup based on the first length allocated to a corresponding one of the first-type subgroups by setting a ratio between each of the first lengths and a respective one of the second lengths to be constant; and
   a three-dimensional display unit that displays, in a three-dimensional coordinate system having the first axis, the second axis and a third axis,
      the first-type elements of each first-type subgroup to be arranged within a region of each first-type subgroup that is arranged along the first axis to have the corresponding first length,
      the second-type elements of each second-type subgroup to be arranged within a region of each second-type subgroup that is arranged along the second axis to have the corresponding second length, and
      graphical representations of the acquired statistical variables along the third axis, each of the graphical representations of the acquired statistical variables being disposed correspondingly to one of the first-type elements arranged along the first axis and one of the second-type elements arranged along the second axis.

2. A statistical variable display apparatus as defined in claim 1, wherein the subgroup acquisition unit acquires the first-type subgroups and the second-type subgroups by dividing each of the plural groups within an organization into a respective one of the first-type subgroups and a respective one of the second-type subgroups.

3. A statistical variable display apparatus as defined in claim 2, wherein the three-dimensional display unit displays:
   the graphical representations of the acquired statistical values between the first-type elements and the second-type elements respectively belonging to the first-type subgroup and the second-type subgroup divided from one of the plural groups; and
   the graphical representations of the acquired statistical values between the first-type elements and the second-type elements respectively belonging to the first-type subgroup and the second-type subgroup divided from another one of the plural groups,
   to be disposed diagonally on a plane defined by the first and second axes.

4. A statistical variable display apparatus as defined in claim 2, wherein an arrangement order of the first-type subgroup of one of the plural groups along the first axis is the same as an arrangement order of the second-type subgroup of the same one of the plural groups along the second axis.

5. A statistical variable display apparatus as defined in claim 1, wherein the ratio is 1:1.

6. A statistical variable display apparatus as defined in claim 1, wherein the first-axis-relating length determination unit determines the first lengths based on the numbers of the first-type elements belonging to the first-type subgroups.

7. A statistical variable display apparatus as defined in claim 1, further comprising:
   an arrangement order changing unit that changes an arrangement order of the elements within at least one of the first-type subgroup and the second-type subgroup so that the displayed statistical variables of those elements may change monotonously along the arrangement of those elements.

8. A statistical variable display apparatus as defined in claim 1, further comprising:
   an arrangement order changing unit that changes an arrangement order of the first-type subgroups along the first axis and/or an arrangement order of the second-type subgroups along the second axis so that the displayed statistical variables may change monotonously along the arrangement of the first-type and/or second-type subgroups.

9. A statistical variable display apparatus as defined in claim 1, further comprising:
   an optical attribute changing unit that changes an optical attribute for the graphical representations of the statistical variables in accordance with sorts of the groups.

10. A statistical variable display apparatus as defined in claim 9, wherein the optical attribute is color.

11. A statistical variable display apparatus as defined in claim 1, wherein for at least one of the first-type subgroups and the second-type subgroups, the statistical variables are displayed in numerical units for each member of the subgroup.

12. A statistical variable display apparatus as defined in claim 1, wherein the graphical representations of the statistical variable are displayed in two dimensions, with a display surface being a plane which extends along the third axis.

13. A statistical variable display apparatus as defined in claim 12, wherein the plane extending along the third axis extends along diagonal components of the first axis and the second axis.

14. A statistical variable display apparatus as defined in claim 12, wherein the plane extending along the third axis extends along one of the first axis and the second axis.

15. A statistical variable display apparatus as defined in claim 1, further comprising:
a boundary setting unit that sets a boundary between the first-type subgroup and the second-type subgroup.

16. A statistical variable display apparatus as defined in claim 2, wherein the first-type elements are defined by having managerial posts of non-administrative staff, and the second-type elements are defined by having managerial posts of administrative staff.

17. A statistical variable display apparatus as defined in claim 2, further comprising:
a grouping setting unit that sets division of the plural groups within the organization.

18. A statistical variable display apparatus as defined in claim 17, wherein the organization is hierarchized, and the division of the plural groups is set by designating a hierarchical level.

19. A statistical variable display apparatus as defined in claim 1, wherein the statistical variable is an amount of electronic communications.

20. A statistical variable display method comprising the steps of:
acquiring first-type subgroups and second-type subgroups from plural groups;
acquiring first-type elements belonging to each first-type subgroup and second-type elements belonging to each second-type subgroup;
acquiring a statistical variable between each of the first-type elements and each of the second-type elements;
determining first lengths along a first axis, the first lengths being respectively allotted to the first-type subgroups, wherein the first lengths are variable;
determining a second length, along a second axis, allotted to each second-type subgroup based on the first length allocated to a corresponding one of the first-type subgroups by setting a ratio between each of the first lengths and a respective one of the second lengths to be constant; and
displaying, in a three-dimensional coordinate system having the first axis, the second axis and a third axis,
the first-type elements of each first-type subgroup being arranged within a region of each first-type subgroup that is arranged along the first axis to have the corresponding first length,
the second-type elements of each second-type subgroup being arranged within a region of each second-type subgroup that is arranged along the second axis to have the corresponding second length, and
graphical representations of the acquired statistical variables along the third axis, each of the graphical representations of the acquired statistical variables being disposed correspondingly to one of the first-type elements arranged along the first axis and one of the second-type elements arranged along the second axis, wherein
the steps are executed by a computer.

21. A non-transitory storage medium readable by a computer, the storage medium storing a program of instructions executable by the computer to perform a function for displaying statistical variables, the function comprising the steps of:
acquiring first-type subgroups and second-type subgroups from plural groups;
acquiring first-type elements belonging to each first-type subgroup and second-type elements belonging to each second-type subgroup;
acquiring a statistical variable between each of the first-type elements and each of the second-type elements;
determining first lengths along a first axis, the first lengths being respectively allotted to the first-type subgroups, wherein the first lengths are variable;
determining a second length, along a second axis, allotted to each second-type subgroup based on the first length allocated to a corresponding one of the first-type subgroups by setting a ratio between each of the first lengths and a respective one of the second lengths to be constant; and
displaying, in a three-dimensional coordinate system having the first axis, the second axis and a third axis,
the first-type elements of each first-type subgroup to be arranged within a region of each first-type subgroup that is arranged along the first axis to have the corresponding first length,
the second-type elements of each second-type subgroup to be arranged within a region of each second-type subgroup that is arranged along the second axis to have the corresponding second length, and
graphical representations of the acquired statistical variables along the third axis, each of the graphical representations of the acquired statistical variables being disposed correspondingly to one of the first-type elements arranged along the first axis and one of the second-type elements arranged along the second axis.

22. A statistical variable display apparatus comprising:
subgroup acquisition means for acquiring first-type subgroups and second-type subgroups by dividing each of plural groups into a respective one of the first-type subgroups and a respective one of the second-type subgroups;
statistical variable acquisition means for acquiring a statistical variable between each of the first-type subgroups and each of the second-type subgroups;
first-axis-relating length determination means for determining first lengths along a first axis, the first lengths being respectively allotted to the first-type subgroups, wherein the first lengths are variable;
second-axis-relating length determination means for determining second lengths along a second axis, the second lengths being respectively allotted to the second-type subgroups, wherein the second-axis-relating length determination means determines the second length allotted to the respective one of the second-type subgroups based on the first length allotted to the respective one of the first-type subgroups by setting a ratio between each of the first lengths and a respective one of the second lengths to be constant; and
display means for displaying
the first-type subgroups arranged along the first axis to have the respective first lengths,
the second-type subgroups arranged along the second axis to have the respective second lengths, and
representations of the acquired statistical variables, each of the representations of the acquired statistical variables being disposed correspondingly to a respective one of the first-type subgroups arranged along the first axis and a respective one of the second-type subgroups arranged along the second axis.

23. A statistical variable display apparatus comprising:
a subgroup acquisition unit that acquires first-type subgroups and second-type subgroups from plural groups;
an element acquisition unit that acquires first-type elements belonging to each first-type subgroup and second-type elements belonging to each second-type subgroup;

a statistical variable acquisition unit that acquires a statistical variable between each of the first-type elements and each of the second-type elements;

a first-axis-relating length determination unit that determines first lengths along a first axis, the first lengths being respectively allotted to the first-type subgroups, wherein the first lengths are variable;

a second-axis-relating length determination unit that determines a second length, along a second axis, allotted to each second-type subgroup based on the first length allocated to a corresponding one of the first-type subgroups by setting a ratio between each of the first lengths and a respective one of the second lengths to be constant; and a display unit that displays, in a coordinate system having the first axis and the second axis, the first-type elements of each first-type subgroup to be arranged within a region of each first-type subgroup that is arranged along the first axis to have the corresponding first length, the second-type elements of each second-type subgroup to be arranged within a region of each second-type subgroup that is arranged along the second axis to have the corresponding second length, and representations of the acquired statistical variables, each of the representations of the acquired statistical variables being disposed correspondingly to one of the first-type elements arranged along the first axis and one of the second-type elements arranged along the second axis.

24. A statistical variable display apparatus as defined in claim 23, wherein:

the subgroup acquisition unit acquires the first-type subgroups and the second-type subgroups by dividing each of the plural groups into a respective one of the first-type subgroups and a respective one of the second-type subgroups, the display unit displays:

the representations of the acquired statistical values between the first-type elements and the second-type elements respectively belonging to the first-type subgroup and the second-type subgroup divided from one of the plural groups; and the representations of the acquired statistical values between the first-type elements and the second-type elements respectively belonging to the first-type subgroup and the second-type subgroup divided from another one of the plural groups, to be disposed diagonally on a plane defined by the first and second axes.

* * * * *